United States Patent [19]

Vowel

[11] Patent Number: 4,486,129
[45] Date of Patent: Dec. 4, 1984

[54] REAMING APPARATUS

[76] Inventor: James A. Vowel, 204 E. Blackwell, Blackwell, Okla. 74631

[21] Appl. No.: 378,790

[22] Filed: May 17, 1982

[51] Int. Cl.³ .............................................. B23B 41/00
[52] U.S. Cl. ..................................... 408/106; 408/104
[58] Field of Search ............... 408/104, 106, 103, 105, 408/107, 108, 109, 99, 111, 82, 81, 72 R, 137; 82/4 R, 4 C

[56] References Cited

U.S. PATENT DOCUMENTS

| 629,171 | 7/1899 | Radley | 408/104 |
|---|---|---|---|
| 924,378 | 6/1909 | Porter | 408/137 |
| 1,049,125 | 12/1912 | Midgley et al. | 408/104 |
| 1,630,083 | 5/1927 | Hinckley et al. | 408/106 |
| 1,705,240 | 3/1929 | Devine | 408/106 X |
| 2,032,384 | 3/1936 | West | 408/104 |
| 2,094,225 | 9/1937 | Tuttle | 408/106 X |
| 2,164,741 | 7/1939 | Green | 408/82 |
| 2,330,242 | 9/1943 | Romero | 408/104 |
| 2,610,530 | 9/1952 | Caliendo | 408/104 |
| 3,205,734 | 9/1965 | Headley et al. | 408/106 X |
| 3,752,593 | 8/1973 | Fitzgerald et al. | 408/82 X |
| 3,992,123 | 11/1976 | Uyetake et al. | 408/104 |

Primary Examiner—William R. Briggs
Attorney, Agent, or Firm—Alan T. McCollom

[57] ABSTRACT

A reamer for reaming the bell of plastic pipe. A cylindrical housing includes a cylindrical cavity communicating with the lower end of the housing. A downward facing annular shoulder is formed about the circumference of the cavity. The top of the housing includes a bore having a shaft threadably engaged therein. The shaft is concentric with the cavity and includes a reamer at its lower end for reaming the bell of a pipe abutted against the shoulder.

10 Claims, 8 Drawing Figures

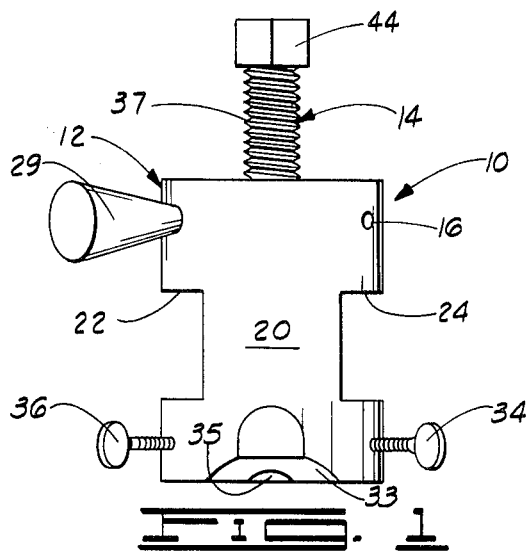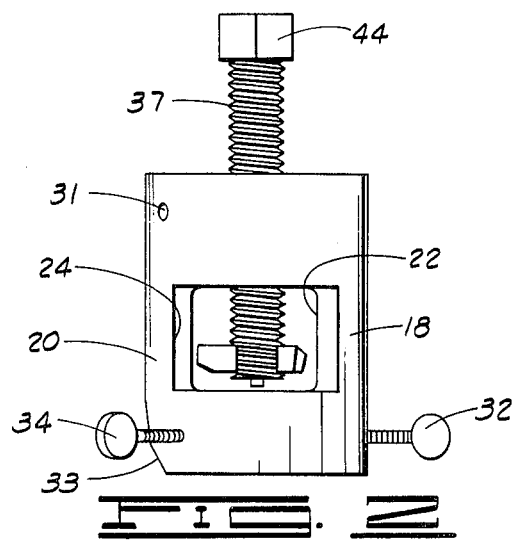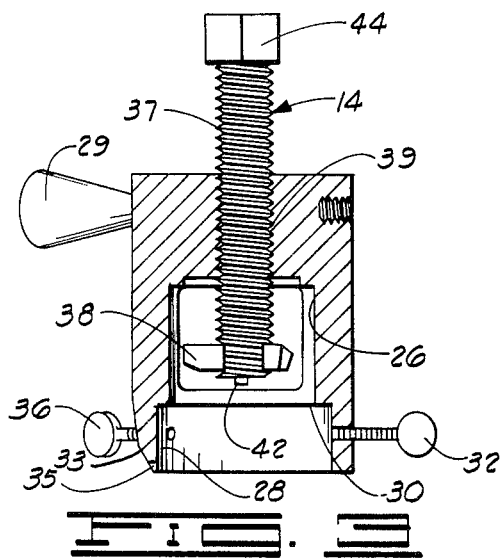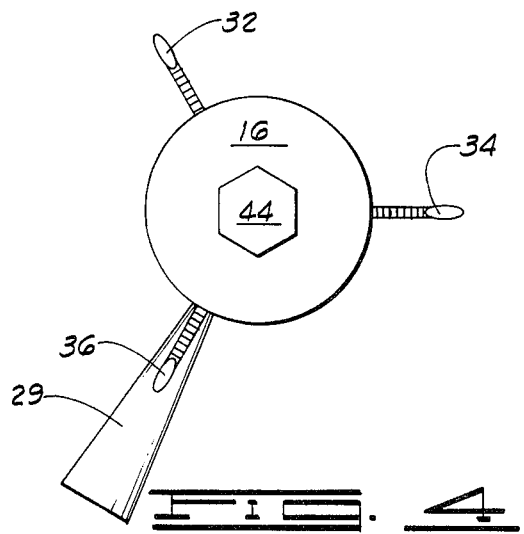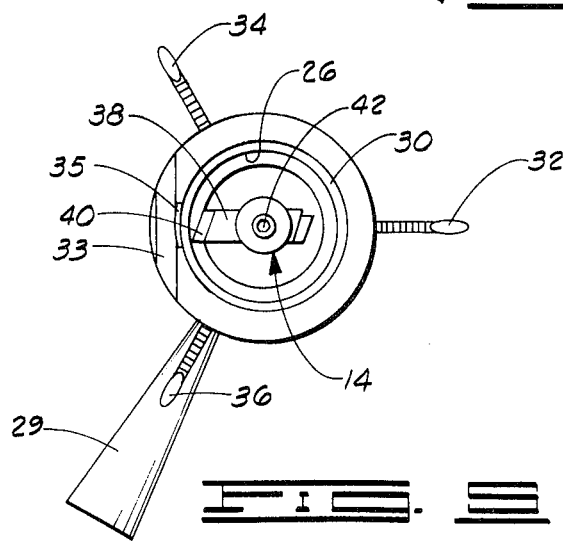

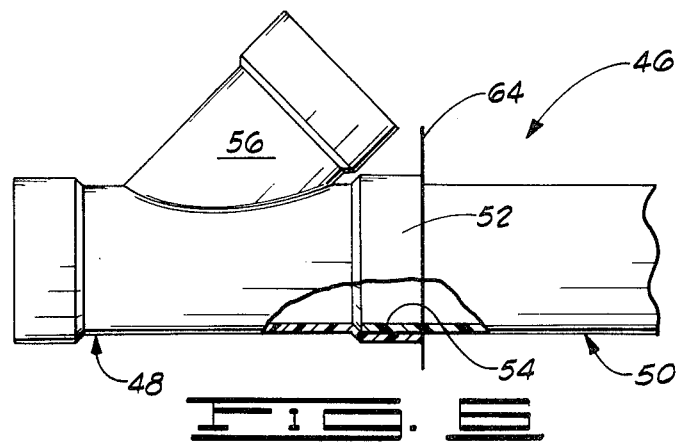
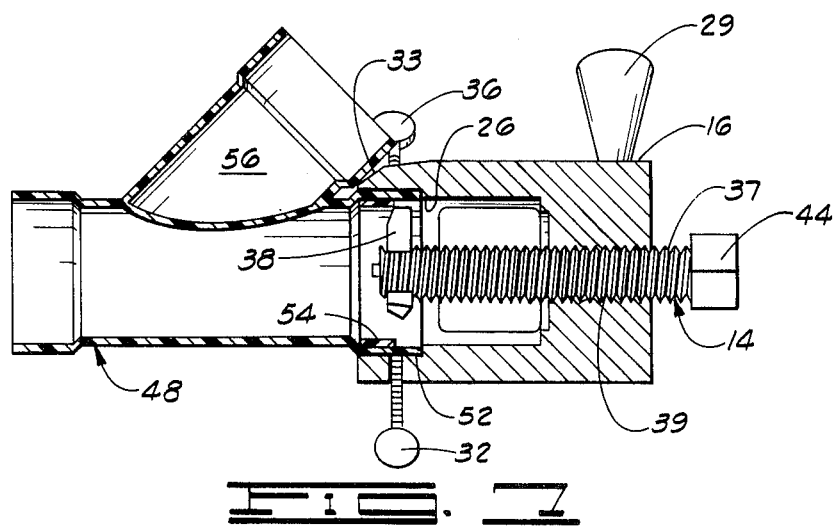
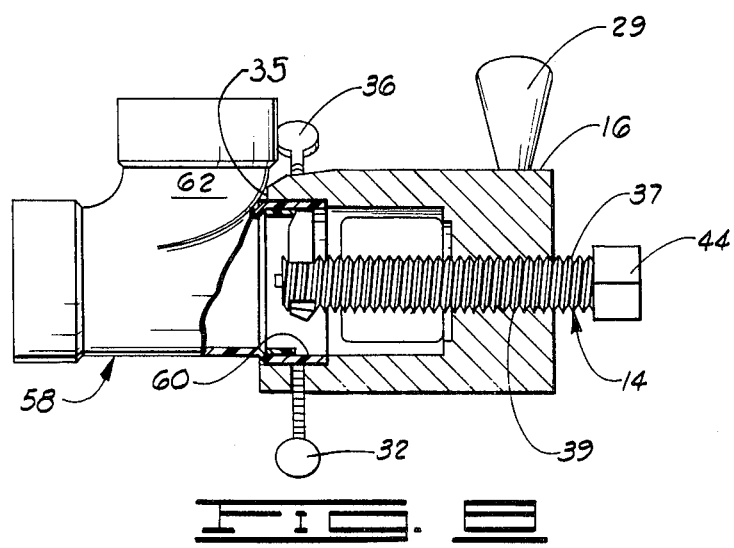

REAMING APPARATUS

BACKGROUND AND SUMMARY OF THE INVENTION

The present invention relates to apparatus for reaming pipe.

Several types of pipe reamers have been proposed in the past. Most of these remove burrs from the inside of metal pipe which are created by cutting or drilling the pipe. Such past reamers usually include a movable cone-shaped reamer that is advanced into the pipe to remove the burr. These reamers are generally heavy and require a great deal of space in which to operate.

When plastic pipes are installed, they are typically joined by gluing the spigot of one end of a pipe into the bell of another. If one of the installed pipes breaks, either the whole system must be replaced, or the break must be cut out so that a particular size connector may be inserted. If the pipe break is very large or inconveniently located, the latter operation is precluded.

One advantage of the instant invention is that it allows removal of a section of broken pipe, reaming glue and the spigot of the broken pipe out of the bell of the adjacent pipe, and inserting a new pipe in place of the broken one.

The reamer has an additional advantage of fitting over the bells of pipes including Y-branch or T-branch joints.

The reamer of the invention includes a housing having a cavity communicating with the lower end of the housing. A downward facing annular shoulder is formed about the circumference of the cavity. A rotatable shaft mounted on the housing has its longitudinal axis substantially aligned with the cavity. A reamer is mounted on the end of the shaft for reaming the bell of a pipe abutted against the shoulder.

Other concomitant advantages will become clear as the following detailed description and drawings are considered.

DESCRIPTION OF THE DRAWINGS

The following drawings represent an embodiment of the invention wherein:

FIG. 1 is a front elevation view of a preferred embodiment of the reamer of the invention.

FIG. 2 is a right side elevation view of the reamer of FIG. 1.

FIG. 3 is a cross-sectional view of the reamer of FIG. 2.

FIG. 4 is a top plan view of the reamer of FIG. 1.

FIG. 5 is a bottom plan view of the view of FIG. 2.

FIG. 6 is a partial cross-sectional view of a standard plastic pipe spigot fitted into a standard plastic pipe bell.

FIG. 7 is a cross-sectional view of the preferred embodiment of the invention fitted over a plastic pipe bell.

FIG. 8 is a cross-sectional view of the preferred embodiment of the invention fitted over a different plastic pipe bell.

DETAILED DESCRIPTION OF THE INVENTION

Referring to FIGS. 1-5, and indicated generally at 10 is a reamer incorporating the instant invention. Included therein is a housing 12 having a shaft 14 mounted on an upper portion 16 of the housing. The housing is generally cylindrically shaped and includes annular walls 18, 20 extending downwardly from upper portion 16. Windows 22, 24 are formed in walls 18, 20 and provide access to an interior chamber 26. A cylindrical chamber 28 is formed in the housing beneath chamber 26 and communicates on its upper end with chamber 26 and on its lower end with the exterior of the housing. Chamber 28 is referred to herein as a first chamber; chamber 26 is referred to herein as a second chamber. A downward facing annular shoulder 30 is formed at the juncture of the chambers.

A handle 29 includes a threaded shaft (not visible) extending from the end of the handle against the housing, such being threadably received within a bore (also not visible) in the housing. Additional threaded bores, like bore 31 in FIG. 2, are provided for receiving the shaft on the end of handle 29 to permit positioning of the handle at selected radial locations about housing 12.

Thumb screws 32, 34, 36 include threaded shafts which are engaged with threaded bores formed in housing 12 between the exterior of the housing and chamber 28. A chamfer 33 is formed on one side of housing 12 at its lower end. A notch 35 is formed in the lower portion of the housing in the middle of chamfer 33. The chamfer is a beveled surface formed on housing 12 while the notch is an opening which extends from the surface of the chamfer to the housing interior.

Shaft 14 includes threads 37 disposed along its length, such being engaged with threads formed in a bore 39 in upper portion 16 through which the shaft extends. The lower end of the shaft includes a reamer 38. Reamer 38 is inserted into a slot which extends crosswise through shaft 14 at the lower end thereof. The reamer includes a cutting edge 40 at its radially outer end (with respect to the axis of shaft 14). A set screw 42 is threadably engaged in a bore aligned with the central axis of shaft 14 at the lower end of the shaft. The bore in which set screw is engaged communicates between the lower end of the shaft and the slot in which reamer 38 is positioned. Set screw 42, when tightened against reamer 38 secures the reamer in the slot at the bottom of shaft 14. A stop or hexhead nut 44 is mounted on the top of shaft 14.

Turning now to FIG. 6, indicated generally therein at 46 is a joint composed of two pieces of plastic pipe 48, 50. Pipe 48 includes a bell 52 which receives a spigot 54 on the end of pipe 50. Bell 52 is an enlarged end portion of pipe 48 having a slightly greater inner diameter than the remainder of pipe 48. The spigot of pipe 50 is simply the end portion of pipe which is received within bell 52. Pipe 48 includes a Y-branch joint 56.

In FIG. 8, a different pipe 58 is shown in combination with a cross-sectional view of reamer 10. Pipe 58 includes a bell 60 and a T-branch 62 joint.

The reamer of the instant invention is typically for use in a situation in which it is desired to replace a pipe having a spigot glued into the bell of another pipe, like spigot 54 is glued into bell 52 in FIG. 6. If, for example, pipe 50 has been damaged and it is necessary to replace it, the pipe is cut along axis 64, the point at which the pipe emerges from bell 52. Shaft 14 on reamer 10 is then rotated counterclockwise, thus moving shaft 14 upwardly, until reamer 38 is completely received within chamber 26. Thereafter, housing 12 is fitted over bell 52 as shown in FIG. 7. More specifically, the bell is received within chamber 28 until the end of the bell (the point at which pipe 50 was cut) abuts against shoulder 30. It is noted that chamfer 33 permits shoulder 30 to be fully abutted against the end of bell 52 without interference from Y-branch joint 56. After the reamer housing is so advanced, set screws 32, 34, 36 are tightened to secure the reamer in place.

Clockwise rotation of shaft 14 is begun. Such rotation advances the shaft from chamber 26 into chamber 28. Reamer 38 has been adjusted with the use of set screw 42 so that its cutting arc just cuts through spigot 54 but not bell 52. Continued clockwise turning of shaft 14 advances the reamer completely about the circumference of bell 52 along the length of the bell thus reaming the glued spigot from the inside of the bell. It should be noted that nut 44 prevents any further rotation or longitudinal advancement of shaft 14 when the nut hits housing 12. At this point, the reamer has just been advanced sufficiently to ream all of the spigot from the bell without being advanced beyond the point at which the inner diameter of the bell narrows.

When the reamer is used with a pipe having a T-branch joint, like joint 62 in FIG. 8, notch 35 receives a portion of the joint in order to permit complete seating of the end of the bell against annular shoulder 30. If the notch were not present in FIG. 8, the bottom end of the housing would strike joint 62 before the housing could be so seated. After seating, the thumb screws are tightened and the shaft advanced with the same reaming effect as described in connection with reaming of pipe 48.

Although a preferred embodiment of the invention has been shown, it is to be appreciated that additions and modifications may be made without departing from the spirit of the invention as defined in the following claims.

What is claimed is:

1. Apparatus for scraping a pipe and glue from the radially inner surface of a pipe bell to which the radially outer pipe surface is glued, said pipe bell having a predetermined depth and said pipe being cut substantially flush with the end of said bell, said apparatus comprising:
   a cylindrical housing having upper and lower ends;
   a first cylindrically shaped chamber formed at the lower end of said housing and communicating with the exterior thereof, said first chamber having a radially inner diameter of a size sufficient to receive such a pipe bell therein;
   a second cylindrically shaped chamber formed above said first chamber in said housing, said second chamber communicating with said first chamber and being coaxial therewith;
   a downward facing annular shoulder formed at the juncture of said first and second chambers for abutment against the end of such a pipe bell, said shoulder having a preselected longitudinal position on said housing;
   a threaded bore formed through the upper end of said housing and having its longitudinal axis in alignment with the longitudinal axes of said chambers;
   a bolt having a preselected length threadably received in said bore, said bolt extending into said first chamber responsive to rotation thereof;
   a reamer mounted on the lower end of said bolt for scraping the radially inner surface of such a pipe bell when it is abutted against said annular shoulder; and
   a head fixedly attached to the upper end of said bolt, said head having a lower side which is substantially parallel to the upper end of said housing, said head preventing further bolt extension into said first chamber when the lower side thereof abuts against said upper housing end, said preselected bolt length and said preselected longitudinal shoulder position being selected relative to one another so that reamer scraping can extend to the depth of such a pipe bell when it is abutted against said shoulder, but not therebeyond.

2. The apparatus of claim 1 wherein said preselected bolt length permits said reamer to extend to the lower end of said housing, but not therebeyond.

3. The apparatus of claim 2 wherein the distance between the lower end of said housing and said shoulder is equal to the depth of such a pipe bell.

4. The apparatus of claim 1 wherein said reamer includes a cutting edge at its radially outer end and wherein said apparatus further includes means for varying the radial position of said cutting edge relative to the longitudinal axis of said bolt.

5. The apparatus of claim 1 wherein said housing includes a notch formed in said housing adjacent the juncture of said first chamber with the exterior of said housing to permit fitting such a pipe bell having a joint formed adjacent said bell into said first chamber.

6. The apparatus of claim 1 wherein said housing includes a chamfer formed in said housing on its lower and outer surfaces adjacent the lower end thereof to permit fitting such a pipe bell having a joint formed adjacent said bell into said first chamber.

7. The apparatus of claim 1 wherein said apparatus further includes an elongate handle extending from the side of said housing for hand stabilization of said housing.

8. The apparatus of claim 1 wherein said apparatus further includes means for clamping said housing to such a pipe bell when it is received in said first chamber.

9. The apparatus of claim 8 wherein said clamping means includes a threaded bore formed in the side of said housing and a bolt threadably engaged therein for screwing into such a pipe bell when it is received within said first chamber.

10. The apparatus of claim 1 which further includes a window formed in said housing between said second chamber and the exterior of said housing for permitting visual observation of the reaming process.

* * * * *